Feb. 6, 1962  R. P. NIELSEN  3,020,368
FOOT-OPERATED SWITCH CLOSABLE BY TRANSVERSE
PIVOTAL MOVEMENT IN ANY DIRECTION
Filed June 16, 1960  2 Sheets-Sheet 1
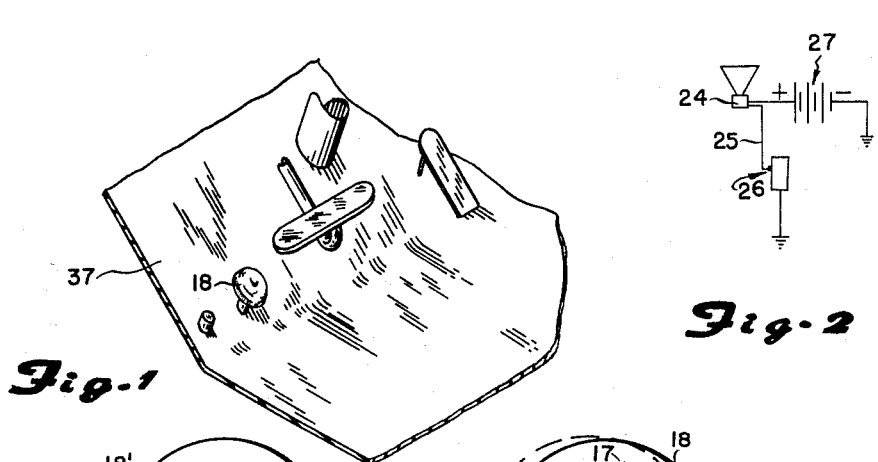
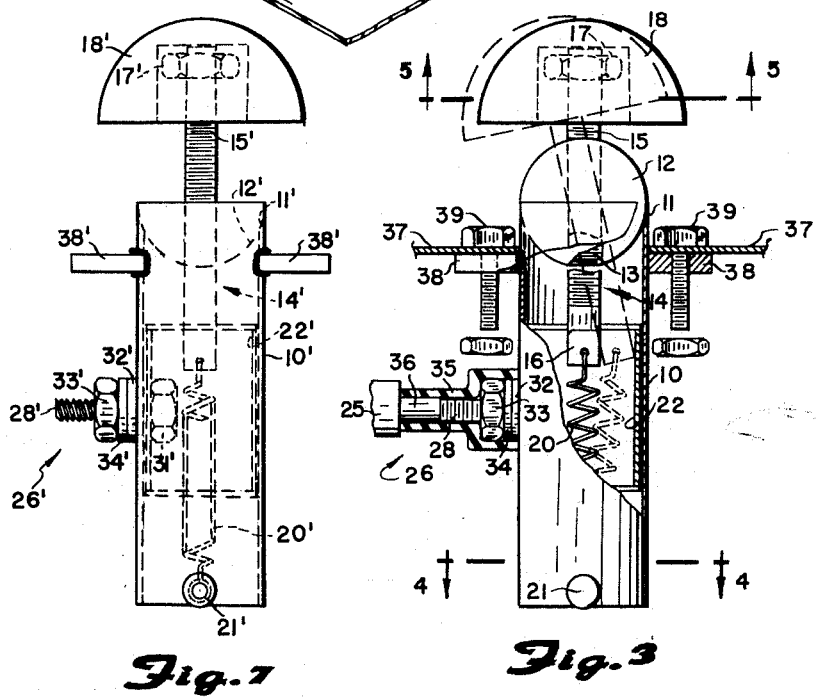
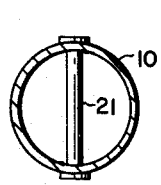
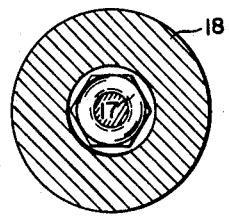
INVENTOR.
RALPH P. NIELSEN Feb. 6, 1962 R. P. NIELSEN 3,020,368
FOOT-OPERATED SWITCH CLOSABLE BY TRANSVERSE
PIVOTAL MOVEMENT IN ANY DIRECTION
Filed June 16, 1960 2 Sheets-Sheet 2
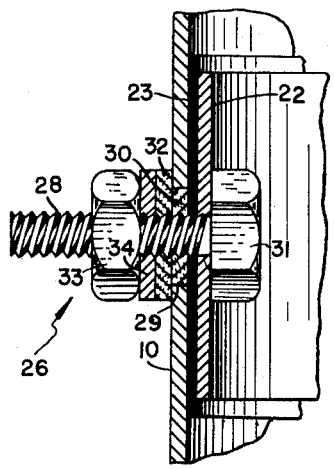
Fig. 6
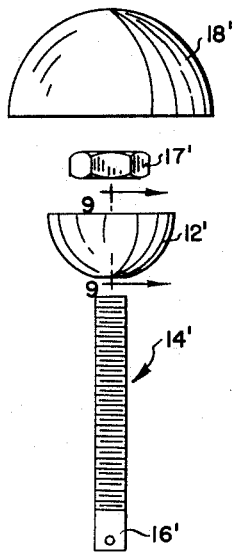
Fig. 8
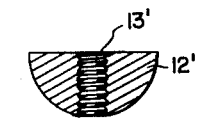
Fig. 9
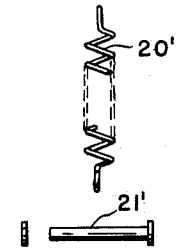
*INVENTOR.*
RALPH P. NIELSEN

United States Patent Office 3,020,368
Patented Feb. 6, 1962

3,020,368
FOOT-OPERATED SWITCH CLOSABLE BY TRANSVERSE PIVOTAL MOVEMENT IN ANY DIRECTION
Ralph P. Nielsen, Boulder, Colo., assignor of one-tenth to Gadget-Of-The-Month Club, Inc., North Hollywood, Calif., a corporation of California
Filed June 16, 1960, Ser. No. 36,556
2 Claims. (Cl. 200—86.5)

The present invention consists of a foot-operated switch closable by transverse pivotal movement in any direction and, in one preferred form, adapted to be carried by the floor board portion of the driver's part of a passenger compartment of a motor vehicle for convenient and easy operation by one foot of the driver of the vehicle (usually the left foot, although not specifically so limited), for closing the horn circuit of the automobile whereby to make it possible to sound the horn as a result of foot operation of the novel closure switch of the present invention without requiring the use of the driver's hands for operating a horn button or ring in the conventional prior art manner, which may be highly undesirable in the event of an emergency situation requiring the use of both of the driver's hands for steering purposes or other vehicle operation purposes. Such an arrangement is particularly advantageous in modern motor vehicles of the type having automatic transmissions and, therefore, having no clutch pedals requiring the use of the driver's left foot for engaging and disengaging a clutch. In such automatic transmission motor vehicles, the driver's left foot is customarily virtually unused, and the novel foot-operated horn circuit closure switch arrangement of the present invention closable by merely pressing the upper foot pedal of the switch transversely in any direction, is highly desirable because it will use the otherwise unused left foot of the driver during emergency situations. However, the invention is not specifically limited to motor vehicles with automatic transmissions.

It is an object of the present invention to provide a novel foot-operated closure switch operable in any direction for effective closure of any desired electric circuit, but particularly adapted for such closure of the horn circuit of a motor vehicle.

It is a further object to provide apparatus of the character mentioned above, which is of extremely simple, cheap, foolproof construction such as to be conducive to widespread use thereof.

Further objects will be apparent to persons skilled in the art after a careful study hereof.

For the purpose of clarifying the nature of the present invention, two exemplary embodiments are illustrated in the hereinbelow-described figures of the accompanying two sheets of drawings and are described in detail hereinafter.

FIG. 1 is a reduced-size fragmentary oblique view showing a portion of a motor vehicle floor board carrying a conventional accelerator, steering post (shown in fragmentary partly broken-away form), brake pedal, and headlight-dimmer floor switch, and additionally showing one exemplary embodiment of the present invention carried by the floor board between the conventional brake pedal and the conventional headlight-dimmer switch for operation by the left foot of a driver of the automobile, when desired, to sound the horn thereof.

FIG. 2 is a reduced-size electrical schematic view showing a power supply, a motor vehicle horn, and the novel foot-operated closure switch of the present invention, with the negative terminal of the power supply and one terminal of the novel foot-operated closure switch of the present invention being grounded (usually to the frame of the automobile). The positive terminal of the power supply is shown as being connected to one terminal of the automobile horn, with the other terminal thereof being connected to the other terminal of the novel foot-operated closure switch of the present invention.

FIG. 3 is a fragmentary, partly broken-away, partly sectional view illustrating one exemplary embodiment of the present invention, showing it in solid lines in normal unactuated position and showing it in broken lines in actuated position.

FIG. 4 is a view taken in the direction of the arrows 4—4 of FIG. 3 showing the spring mounting pin engaging the bottom of the outer mounting sleeve means.

FIG. 5 is a sectional view taken in the direction of the arrows 5—5 of FIG. 3 and shows the engagement of the foot pedal to the upper end of the longitudinal lever member.

FIG. 6 is an enlarged fragmentary sectional view taken longitudinally through the outer mounting sleeve means and the insulatingly spaced inner conductive sleeve means shown in FIG. 3 and illustrates the connection of the inner sleeve means to electrical connector means passing through the outer sleeve means and insulated therefrom and adapted to be connected to one terminal of the automobile horn as shown in FIG. 2.

FIG. 7 is a view generally similar to FIG. 3, but illustrates a slightly modified form of the invention wherein the swivel element is of semi-spherical shape rather than full-spherical shape as shown in the first form of the invention.

FIG. 8 is an exploded elevational view of the various elements of the actuating portion of the novel switch means of the present invention adapted to be inserted within the outer mounting sleeve means and the inner electrically conductive sleeve means.

FIG. 9 is a vertical sectional view through the modified semi-spherical swivel element or ball employed in this modified form of the invention illustrated in FIGS. 7–9, taken in the direction of the arrows 9—9 of FIG. 8.

Referring to FIGS. 1–6 for exemplary purposes, one illustrative embodiment of the invention takes one typical exemplary form including mounting sleeve means 10 of electrically conductive material provided with an electrically conductive seat 11 rotatively receiving a spherical swivel ball 12 of electrically conductive material for universal relative rotation with respect to the seat 11. The spherical swivel element or ball 12 is provided with a vertical interiorly threaded aperture 13 extending downwardly therethrough and vertically adjustably threadedly carrying the exteriorly threaded longitudinal lever member 14 whereby to position an upper portion 15 thereof extending above the ball 12 and whereby to position a lower electrical contact portion 16 thereof below the ball 12 and in a central position within the outer mounting sleeve means 10. It should be noted that the upper end 15 of the lever member 14 is threadedly engaged with a threaded nut 17 centrally carried underneath the top portion of an umbrella-type foot pedal 18. It should further be noted that the lower electrical contact portion 16 is connected to the upper end 19 of a biasing tension spring means 20 which has its lower end connected to a mounting pin 21 carried across the bottom end of the outer mounting sleeve means 10 whereby to apply tension through the biasing spring 20 to the lower end 16 of the lever member 14 in a manner such as to cause said lever member 14 and the biasing spring 20 to normally assume a central co-axial position within the outer mounting sleeve means 10 as shown in solid lines in FIG. 3. However, it will readily be understood that transverse pressure applied to the foot pedal 18 in any direction will transversely deflect same by reason of the pivotal engagement of the swivel ball 12 and the seat 11 in a manner such that the lower electrical contact portion 16 of the electrically conductive longitudinal lever member 14 will be pivotally moved transversely, as indicated by the dotted lines in FIG. 3, until it contacts the inner surface of an inner electrically conductive sleeve 22. The sleeve 22 is centrally positioned within the outer mounting sleeve 10 and is effectively electrically insulated therefrom by electrical insulation means 23 (best shown in FIG. 6) whereby to allow electric current flowing from the horn 24 (shown in FIG. 2), to flow through the lead 25 to the electrical connection means indicated generally at 26, which passes through the outer mounting sleeve means 10 in a manner insulated therefrom into electrical engagement with the inner electrically conductive sleeve 22, and then to flow through the electrical contact portion 16 of the lever member 14, through the swivel ball 12 and seat 11, through the outer mounting sleeve means 10 to ground; it being understood that a power supply 27 is connected between the other terminal of the horn 24 and ground. This provides a continuous circuit through the horn for sounding same whenever the application of transverse force to the foot pedal 18 in any direction causes the electrical contact portion 16 of the lever member 14 to touch the inner electrically conductive sleeve 22. Removal of the foot from the foot pedal 18 allows the biasing spring 20 to immediately return the apparatus to the central position shown in solid lines in FIG. 3, which effectively opens the switch.

It should be noted that, in the specific example illustrated in FIGS. 1-6, the electrical connector means indicated generally at 26 comprises a bolt having a threaded shaft portion 28 of electrically conductive material extending through an aperture 29 in the outer electrically conductive mounting sleeve 10, with an insulating washer 30 positioned between the edge defining the hole 29 and the electrically conductive threaded shaft portion 28, and with the inner end of the threaded shaft carrying the bolt head 31, which is in rigid electrically conductive engagement with the inner electrically conductive sleeve 22. It should be noted that another insulated washer 32 is positioned outwardly of the outer mounting sleeve means 10 and a threaded nut 33 and lock washer 34 hold the entire assembly rigidly together. As best shown in FIG. 3, an outer recessed insulating cap 35 carrying an electrically conductive terminal member 36 connected to the lead 25 is adapted to be slipped over the exterior portions of the electrical connector means 26 whereby to provide an exteriorly insulated electrical connection between the horn 24 and the electrical connector means 26.

The device is adapted to be mounted to the floor board portion of a motor vehicle, such as is indicated at 37 in FIGS. 1 and 3. This may be accomplished by mounting flange means located at any position along the outer mounting sleeve means 10. However, in the form illustrated, the mounting flange means is indicated at 38 and is adapted to fasten the device partially above and partially below the floor board 37 through the use of suitable fastening means 39. However, any desired type of mounting means may be employed.

It should be noted that the threaded engagement of the lever member 14 with the swivel member 12 makes it possible to vertically adjust same whereby to change the relationship of the upper and lower lever arm portions and also the effective tension of the spring means 20 so as to bring about optimum operating conditions for any particular person or circumstance of use.

The modified form of the invention illustrated in FIGS. 7-9 is generally similar to the first form described above and illustrated in FIGS. 1-6, and similar parts will be indicated by similar reference numerals, primed. In this modification, the major difference is the fact that the swivel element 12' is of semi-spherical shape rather than of full spherical shape as in the first form of the invention previously described. This makes it possible to shorten the overall device, if desired.

It should be noted that the electrically conductive parts of the present invention are preferably made of materials of great electrical conductivity such as copper, brass, aluminum, or the like, although any suitable materials having suitable electrical conductivity characteristics may be employed.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:
1. A foot-operated switch closable by transverse pivotal movement, comprising: mounting sleeve means of electrically conductive material provided with a partially spherical electrically conductive seat means at the top thereof; an at least partially spherical swivel ball element of electrically conductive material rotatively carried in said seat means for universal relative rotation with respect thereto; a longitudinal lever member vertically adjustably carried by said swivel ball element centrally downwardly therethrough with an upper portion extending thereabove and being provided with a foot pedal and with a lower electrical contact portion extending therebelow into a central position within said mounting sleeve means; biasing tension spring means connected at one end to the lower end of said lever member and provided at the other end with mounting pin means connected to a lower portion of said mounting sleeve means for biasing said lever member into central aligned relationship with respect to said seat means and said mounting sleeve means; and electrically conductive encompassing contact means comprising inner cylindrical sleeve means spacedly mounted within said outer mounting sleeve means around the electrical contact portion of said lever member and electrically insulated from said outer mounting sleeve means.

2. Apparatus of the character defined in claim 1, including electrical connector means connected to said inner sleeve means and insulated from said outer sleeve means, said electrical connector means comprising one terminal of the foot-operated switch and the outer electrically conductive mounting sleeve means effectively comprising the other terminal thereof, normally adapted to be connected to ground.

References Cited in the file of this patent

UNITED STATES PATENTS

| | | |
|---|---|---|
| 1,426,193 | Holmgren | Aug. 15, 1922 |
| 2,521,489 | Sorensen | Sept. 5, 1950 |